United States Patent [19]

Hayashi et al.

[11] Patent Number: 4,646,208
[45] Date of Patent: Feb. 24, 1987

[54] VEHICLE TOP MARK

[75] Inventors: Ken-ichi Hayashi, Inazawa; Kunikazu Hirozawa, Hashima; Masahiro Kotaki, Nishio, all of Japan

[73] Assignee: Toyoda Gosei Co., Ltd., Nishikasugai, Japan

[21] Appl. No.: 808,838

[22] Filed: Dec. 12, 1985

[30] Foreign Application Priority Data

Dec. 15, 1984 [JP] Japan .................................. 59-190411

[51] Int. Cl.$^4$ ............................................. B60R 13/04
[52] U.S. Cl. ......................................... 362/80; 362/84; 362/800; D12/197; 40/591; 280/727; 428/31
[58] Field of Search ............................ 428/31; 40/591; 280/727; D12/197; 362/80, 84, 800

[56] References Cited

U.S. PATENT DOCUMENTS 4,349,591  9/1982  Kanamori .............................. 428/31
4,400,417  8/1983  Kanamori et al. ..................... 428/31
4,443,832  4/1984  Kanamori et al. ................. 428/31 X

FOREIGN PATENT DOCUMENTS 58-56941  4/1983  Japan ..................................... 428/31

Primary Examiner—Henry F. Epstein
Attorney, Agent, or Firm—Cushman, Darby & Cushman

[57] ABSTRACT

A vehicle top mark including a base to be fixed to the body of a vehicle, a light-transmitting body that stands on the base, and a light source built into the base. The upper end of the light-transmitting body has an inclined surface that is inclined upward from the front side to the back side, so that the upward light, which passes through the light-transmitting body from the light source, is reflected to the back side of the light-transmitting body. The vehicle top mark is visible to the driver in the nighttime.

3 Claims, 5 Drawing Figures

VEHICLE TOP MARK

BACKGROUND OF THE INVENTION

1. Field of the Invention

The present invention relates to a vehicle top mark. A vehicle top mark (100) is mounted on the forward end of the hood (101) as shown in FIG. 5. It tells the driver the forward position of the vehicle and it also serves as an ornament that imparts a high-quality image to the vehicle.

2. Description of the Prior Art

The conventional top mark is usually made of plastics and finished with plating. It is intended mainly for decoration. There is known one which has a built-in luminous body as disclosed in Japanese Patent Laid-Open No. 56,941/1983.

Since the conventional top mark is intended mainly for decoration, it is visible to the driver in the daytime and it tells the driver the forward position of the vehicle. But it is invisible to the driver in the nighttime. The present invention was completed in order to solve this problem.

SUMMARY OF THE INVENTION

Accordingly, it is an object of the present invention to provide a vehicle top mark which comprises a base to be fixed to the body of a vehicle, a light-transmitting body that stands on the base, and a light source built into the base. The upper end of the light-transmitting body has an inclined surface that is inclined upward from the front side to the back side, so that the upward light, which passes through the light-transmitting body from the light source, is reflected to the back side of the light-transmitting body.

BRIEF DESCRIPTION OF THE DRAWINGS

FIG. 1 is a longitudinal sectional side view of the vehicle top mark.

FIG. 2 is a longitudinal sectional side view of the upper part of the light-transmitting body.

FIG. 3 is a rear view of the major part of the light-transmitting body.

DETAILED DESCRIPTION OF THE INVENTION

Figure 1:
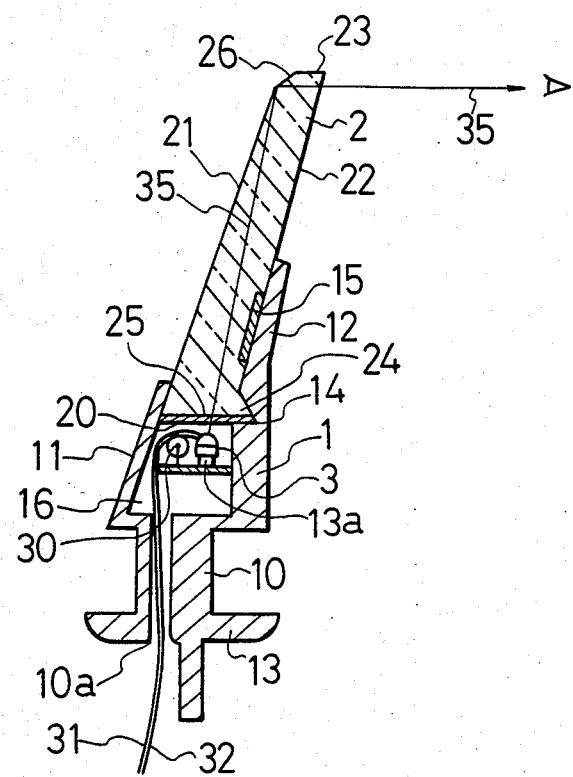
FIGS. 1 to 3 illustrate one example of this invention.

The base which is a constituting element of this invention is intended to hold the light-transmitting body and the light source. It can be fixed to the body of a vehicle by conventional screws. Preferably, the base may be mounted such that the top mark can be brought down or raised at will.

The light-transmitting body which is a constituting element of this invention can be a transparent body or a semitransparent body that stands on the base. To make the light-transmitting body stand on the base, the lower end of the light-transmitting body may be fitted into the hollow formed in the base. The light-transmitting body is preferably as transparent as possible. It is usually colorless and transparent; but it may be colored as required. It can be made of transparent plastics such as acrylic resin and epoxy resin. Any other known thermoplastic resins and thermosetting resins can be used.

The light source which is a constituting element of this invention is built into the base. The preferred light source is a light emitting diode (LED); but it can be a lamp or an electroluminescence plate. The advantages of an LED is a long life and a low driving voltage (1 V to 2 V). A preferred LED has a luminance of several fL (foot Lambert). One LED will be usable as the light source, but two or more LEDs also will be usable. The emission color may be selected from orange, yellow, green, and blue. It is preferable to place a light-diffuser film or reflector between the light source and the light-transmitting body. For power supply, the light source is electrically connected to the battery mounted on the vehicle.

The top mark of this invention has such a configuration that the upper end of the light-transmitting body has an inclined surface that is inclined upward from the front side to the back side. The front side of the light-transmitting body means that side which faces the forward end of the vehicle. The back side of the light-transmitting body means that side which faces the vehicle's driver's seat. Where the light-transmitting body is made of plastics, the inclined surface is also integrally formed. In some cases, the inclined surface may be formed by grinding and polishing the upper end of the light-transmitting body after molding from plastics.

The inclination angle of the inclined surface should be such that the incident angle of the incident ray hitting the inclined surface is greater than the critical angle. The critical angle means an angle at which total reflection occurs. The inclined surface is preferably curved. In special cases, the inclined surface may be provided with a reflecting layer of deposited silver or aluminum, or coated with a fluorescent paint.

When the light source is turned on in the nighttime, the light in the upward direction passes through the light-transmitting body and reaches the inclined surface. The light is reflected by the inclined surface and directed to the back side of the light-transmitting body or to the driver's seat. This takes place due to total reflection by the inclined surface. If the inclined surface is properly curved, the light is reflected uniformly toward the driver seat. The reflected light is easily visible to the driver, and the driver will notice the bright upper end of the light-transmitting body.

The top mark of this invention has an advantage in that the upper end of the light-transmitting body is bright and visible in the nighttime. Thus the driver can easily notice the position of the top mark and hence the front end of the vehicle in the nighttime.

DETAILED DESCRIPTION OF THE PREFERRED EMBODIMENTS

Figure 2:
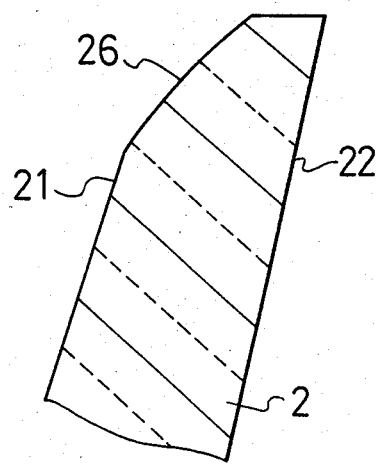
Figure 3:
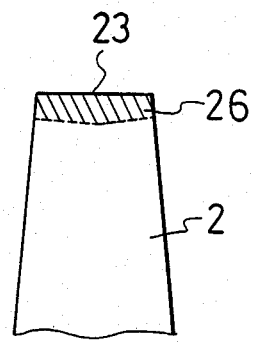

An example of this invention is shown in FIGS. 1 to 3. The vehicle top mark in this example is made up of the base (1), the light-transmitting body (2), and the light source LED (3).

The base (1) is a member to be fixed to the body of a vehicle; and it is made of zinc by die casting. The base (1) is constructed of the support (10) having a through hole, the front panel (11) which extends upward from the support (10), the rear panel (12) which extends upward from the support (10), said front panel (11) and rear panel (12) forming the hollow (16) between them, and the mount (13) to be fixed directly to the body of a vehicle.

The light-transmitting body (2) is 5 to 10 mm thick and is made of transparent acrylic resin. It has the bottom surface (20), the front surface (21), the back surface (22), and the top surface (23). On the back surface (22) of the light-transmitting body (2) is inscribed the mark (15) which may be desired letters or patterns. This mark (15) can be seen from the front side of the vehicle. On the bottom surface (20) is attached the light-diffuser film (25) made of polyacetate (e.g., LDS-219W, made by Nitto Denko Co., Ltd.). The engaging projection (24) is formed at the lower part of the back surface (22) of the light-transmitting body (2). The lower part of the light-transmitting body (2) is fitted into the hollow (16) formed between the front panel (11) and the rear panel (12), and the engaging projection (24) is engaged with the groove (14) on the rear panel (12), whereby the light-transmitting body (2) is set up on the base (1).

As shown in FIG. 2, the upper end of the light-transmitting body (2) has the inclined surface (26), which is inclined upward from the front surface (21) of the light-transmitting body (2) toward the back surface (22). The inclined surface (26) is formed so that the light from the LED (3) undergoes total reflection.

The LED (3) used in this example emits yellow light. It is placed in the hollow (16), with the light-emitting side upward, and is fixed to the plate (13a) of the base (1). This LED (3) is electrically connected to the battery through the resistor (30) and lead wires (31, 32), so that it is turned on and off by operating a switch (not shown). The lead wires (31, 32) pass through the hole (10a) in the support (10).

As the switch (not shown) is turned on and an electric current is applied to the LED (3), the LED (3) emits light. As indicated by the arrow (35) in FIG. 1, the light radiating upward from the LED (3) passes through the light-transmitting body (2) and hits the inclined surface (26) at an angle greater than the critical angle. Therefore, the light is reflected by the inclined surface (26) and directed toward the back surface (22) of the light-transmitting body (2) or toward the driver's seat. As the result, the driver can see the bright inclined surface (26) of the light-transmitting body (2). FIG. 3 is a rear view of the major part of the light-transmitting body (2). The bright part is indicated by hatching.

Figure 4:
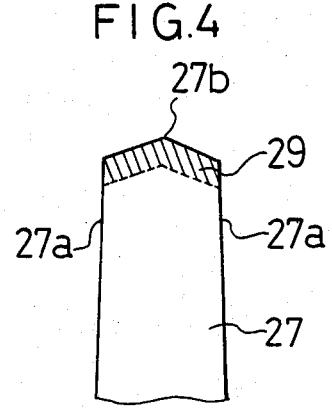
FIG. 4 illustrates the other example of this invention, and it is a rear view of the major part of the light-transmitting body.
Figure 5:
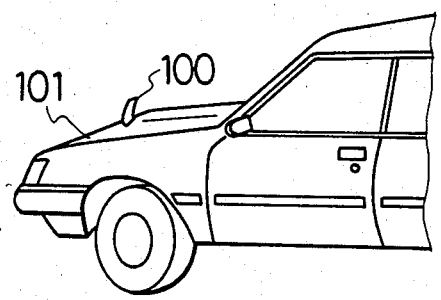
FIG. 5 is a partial perspective view of a vehicle provided with the top mark.

FIG. 4 is a rear view of the major part of the light-transmitting body (27) in another example of this invention. In this example, the upper end of the light-transmitting body (27) has the inclined surface (29). This inclined surface (29) is inclined upward from the front surface to the back surface of the light-transmitting body (2). At the same time, as shown in the rear view of FIG. 4, the inclined surface (29) is inclined downward from the center top (27b) to the side (27a) of the light-transmitting body (2).

What is claimed is:

1. A vehicle top mark comprising:
   a base adapted to be fixed to the body of a vehicle,
   a light-transmitting body standing on said base, and
   a light source built into said base,
   said light-transmitting body having an upper end which has an inclined surface that is inclined upward from front to back, so that light, which passes upwards through said light-transmitting body from said light source, is totally reflected at said inclined surface and goes into the back of said light-transmitting body.

2. A vehicle top mark according to claim 1, wherein said light source is a light emitting diode.

3. A vehicle top mark according to claim 1, wherein said light-transmitting body is made of transparent plastics.

* * * * *